United States Patent
Sands, III

(10) Patent No.: US 6,888,478 B1
(45) Date of Patent: May 3, 2005

(54) DATA RECORDING ON DIGITAL MEDIA USING DIRECTION AND POSITION OF RECORDING FOR COMPRESSION OF RECORDED DATA

(75) Inventor: William H. Sands, III, Pennsburg, PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 10/771,013

(22) Filed: Feb. 3, 2004

(51) Int. Cl.$^7$ ............................................. H03M 7/00
(52) U.S. Cl. ................................................. 341/50
(58) Field of Search .......................... 341/50, 51, 71, 341/72, 74

(56) References Cited

U.S. PATENT DOCUMENTS

| | | | |
|---|---|---|---|
| 3,108,621 A | * 10/1963 | Harries | 141/8 |
| 3,739,086 A | * 6/1973 | Heather | 360/42 |
| 4,027,335 A | * 5/1977 | Miller | 360/40 |
| 4,181,817 A | * 1/1980 | Gallo | 714/820 |
| 4,234,897 A | * 11/1980 | Miller | 360/45 |
| 4,617,553 A | * 10/1986 | Webster et al. | 341/58 |
| 4,866,395 A | * 9/1989 | Hostetter | 329/309 |
| 5,726,966 A | * 3/1998 | Sugaya | 369/59.18 |
| 6,496,172 B1 | * 12/2002 | Hirakata | 345/96 |

* cited by examiner

Primary Examiner—Peguy JeanPierre
(74) Attorney, Agent, or Firm—Lisa A. Rode; Mark T. Starr; WoodcockWashburn LLP

(57) ABSTRACT

A method and encoding/decoding apparatus that achieves an increase in the amount of data stored in or on a recording medium by utilizing the polarities as well as the locations within the cells to minimally double the recording density of that medium. This encoding is effected by the recording of two or more digits in the same transition with the direction and position of the recording indicating its contents. The respective cells include two or more timing boundaries that are used in the encoding process. The boundaries are used to encode based on location of transitions within the cell. The number of boundaries (b) needed to provide a unique identity for all encoding options within the cell is $b=2^{n-1}$ where "n" is the number of bits to be encoded by each cell. The direction of transition of a reference bit may also be used to uniquely identify the bit encoding to provide a second tier of encoding and a level of data compression.

44 Claims, 9 Drawing Sheets

*Encoder*

*Decoder*

Encoder

*Decoding*

Relationship Diagram

Two Bit AC Implementation

Three Bit Implementation

DATA RECORDING ON DIGITAL MEDIA USING DIRECTION AND POSITION OF RECORDING FOR COMPRESSION OF RECORDED DATA

FIELD OF THE INVENTION

The present invention relates to a system and method for achieving an increase in the amount of data stored in or on a recording medium by utilizing the polarities of the recording method to minimally double the recording density of the medium and, more specifically, to a system and method that records and/or transmits data such that two or more digits are recorded in the same transition with the direction and/or position of the transition indicating the data contents.

BACKGROUND OF THE INVENTION

Many techniques are known for encoding a stream of binary data for storage on a medium such as a magnetic tape, CD, or DVD, and for decoding the stored data for playback. Those skilled in the art appreciate that data or information in binary form includes data bits in which the information in each bit is in the form of one or the other of two logical states. Such states are referred to as the logical "1" and the logical "0" states. In operating with information in binary form, it is necessary to distinguish the respective logical states for each bit during the encoding/decoding process. Each bit of information may be said to be maintained in a bit cell that represents an interval in time or space that contains the respective bit of information. The interval is typically determined by some sort of sampling interval or timing pulse. The respective logic states may be referred to variously as "yes" or "no," "+" or "−," "up" or "down," "true" or "not true," and the like. For purposes of this invention, it makes no difference which of the two states is called a "1" state and which is called a "0" state.

One technique for transmitting digital data and/or for storing such digital data is that utilized in the recording and reproducing system disclosed by A. Miller in U.S. Pat. No. 3,108,261. The so-called Miller code represents logical "1" by signal transitions at a particular location in the respective bit cells (mid-cell) and logical "0" by signal transitions at a different particular location in the respective bit cells (at the beginning or leading edge of each bit cell). The Miller code also suppresses any transition occurring at the beginning of one bit interval following a bit interval containing a transition at the center.

Numerous techniques have been proposed over the years to improve upon the Miller code. For example, J. Miller proposes in U.S. Pat. Nos. 4,027,335 and 4,234,897 to remove the DC component from the Miller code by providing indicating signals that indicate bit states that might introduce a DC component and modifying the code to eliminate the DC component. One proposed technique for modifying the code is to encode pairs of bit states by a single transition early in the first bit-cell of the pair of bit states. Others, such as Webster et al. in U.S. Pat. No. 4,617,553, modify the Miller code by breaking the digital data stream into a sequence of blocks delineated by a one-to-zero transition at the beginning of each block and further subdividing each block such that the first half contains only zeros and the second half contains only ones. The number of zeros and ones are counted and encoded based on whether the number of ones and zeros is odd or even. On the other hand, Gallo in U.S. Pat. No. 4,181,817 converts pulses for each level transition into a pair of complementary level pulses for transmission. A single level pulse is produced from the transmitted complementary level pulses when the instantaneous level of both of the complementary pulses are the same during a transition and thereafter an output signal is provided having a level transition for each pulse.

In each of these prior art techniques, a single bit of digital data is represented in each cell by its location within that cell. However, multiple bits of digital data are not encoded within a cell, and the polarity of the bits within each cell is not used in conjunction with the bit location within the cell to provide further data encoding within each cell. In the current technology environment where it is desired to compress as much data as possible into as small a recording medium as possible, it is desired to extend the Miller coding scheme to provide data compression to at least double the recording density of the medium without increasing the data rate. The present invention addresses this need in the art.

SUMMARY OF THE INVENTION

The above-mentioned needs in the art are met by a method and encoding/decoding apparatus that achieves an increase in the amount of data stored in or on a recording medium or transmitted in a certain interval by utilizing the polarities as well as the locations within the cells to minimally double the recording density. This encoding is effected by the recording of two or more digits in the same transition with the direction and position of the recording indicating its contents. In accordance with the invention, the respective cells include two or more timing boundaries that are used in the encoding process. The boundaries encode based on location of transitions within the cell. The number of boundaries (b) needed to provide a unique identity for all encoding options within the cell is $b=2^{n-1}$ where "n" is the number of bits to be encoded by each cell. For example, two boundaries are needed to uniquely define transitions for (00), (01), (10) and (11) within the cell while four boundaries are needed to uniquely define transitions for 000 through 111. The direction of transition of a reference bit may also be used to uniquely identify the bit encoding to provide a second tier of encoding and a level of data compression.

BRIEF DESCRIPTION OF THE DRAWINGS

A data recording technique in accordance with the invention is further described below with reference to the accompanying drawings, in which.

DETAILED DESCRIPTION OF ILLUSTRATIVE EMBODIMENTS

Figure 1:
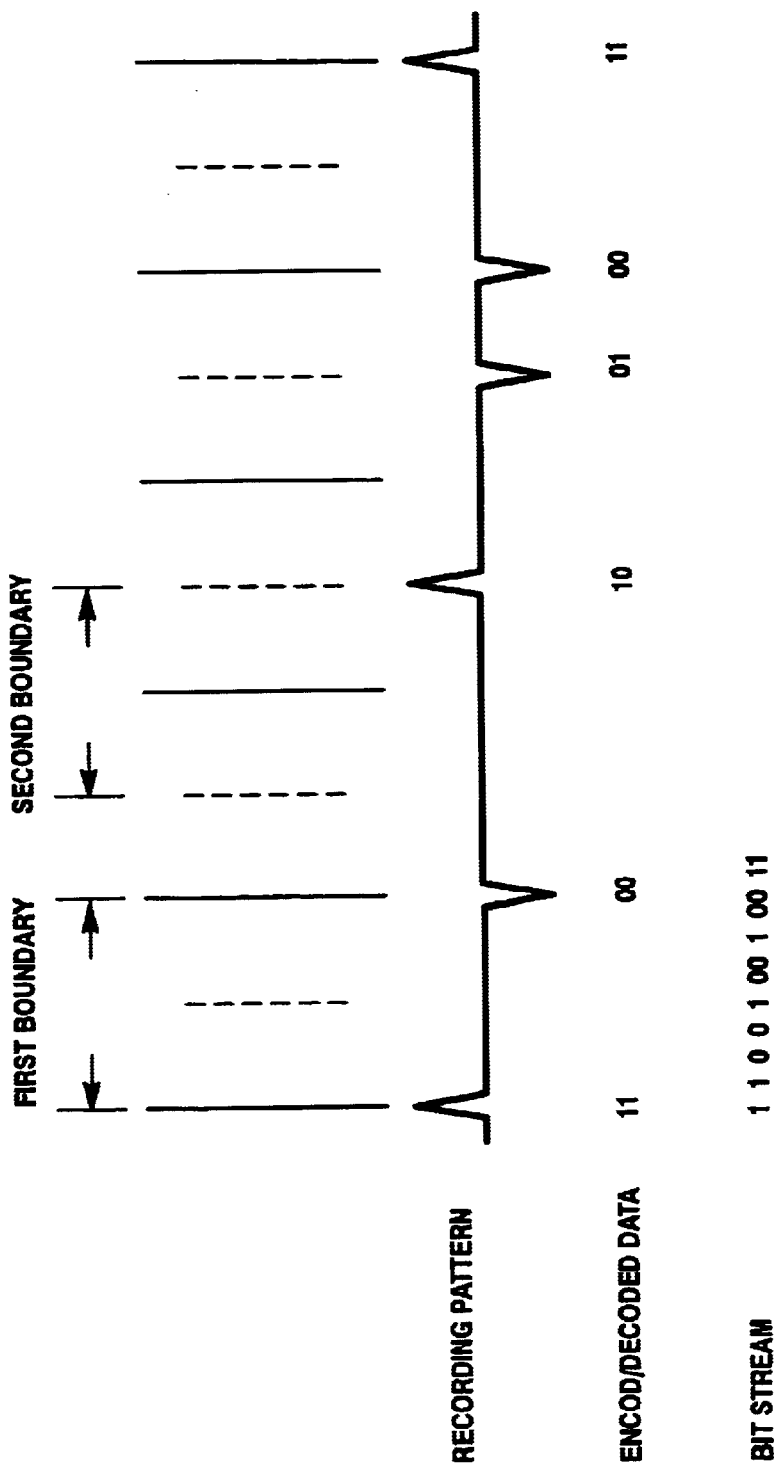
FIG. 1 illustrates the recording pattern for an incoming bit stream "11010010011" using the two-bit encoding technique of the invention.

A detailed description of illustrative embodiments of the present invention will now be described with reference to FIGS. 1–10. Although this description provides detailed examples of possible implementations of the present invention, it should be noted that these details are intended to be exemplary and in no way delimit the scope of the invention.

As noted above, the present invention provides a mechanism for achieving an increase in the amount of data stored in or on a recording medium or transmitted in a certain interval by utilizing the polarities as well as the locations within the cells to minimally double the recording density of that medium. This encoding is effected by the recording of two or more digits in the same transition with the direction and position of the recording indicating its contents. Two, three and four bit embodiments will be described herein; however, those skilled in the art will appreciate how the techniques described herein may be used to encode more bits into a cell.

In the examples to follow, an incoming bit stream to be stored is input into an encoder and broken up into cells under control of a timing signal used to latch the incoming data into buffers for encoding. This timing signal is received every few bits in accordance with the bit encoding being utilized. For example, a two-bit encoding embodiment will latch every two bits and a three-bit encoding embodiment will latch every three bits. In the examples to follow, the cells include two or more timing boundaries that are used in the encoding process in accordance with the invention. In particular, the boundaries are used to encode based on location of transitions within the cell. The number of boundaries (b) needed to provide a unique identity for all encoding options within the cell is b=$2^{n-1}$ where "n" is the number of bits to be encoded by each cell. For example, in the two-bit example below, 2 boundaries are needed to uniquely define transitions for (0), (01), (10) and (11) within the cell. As also noted in the examples below, the direction of transition of a reference bit also may be used to uniquely identify the bit encoding to provide a second tier of encoding and a level of data compression. In a group code recording scheme, the same effect can be realized by selecting code patterns that provide the same results by use of otherwise insignificant patterns.

Two Bit Encoding

As an example of an implementation of the invention, in a binary recording scheme digits of the same value are recorded at boundary 1 with digits of unequal value being recorded at boundary 2. If the digits are the same and the reference digit is a one, then the transition to induce the recording would be in a direction of one magnitude while the transition would be in the direction of an opposite magnitude if the reference bit is a zero. For different values, the transition would occur at a second boundary with the direction of the transition being in one magnitude if the reference digit is one and in the opposite, or different, magnitude if it is a zero.

FIG. 1 illustrates a sample recording pattern for an incoming bit stream "110010010011" using the two-bit encoding technique of the invention. The example in FIG. 1 provides an example of the encoding for all respective two bit combinations: 00, 01, 10, and 11. As illustrated, in accordance with a first embodiment of the invention, a pair of digits is recorded at one boundary if the digits are equal in value and at another boundary if the digits are unequal in value. The direction of the transition provides the value of the reference digit with the position providing the identity.

Thus, in FIG. 1, 11 and 00 are recorded at the first boundary in the cell. 11 is represented by a positive pulse, while 00 is represented by a negative pulse. Similarly, 01 and 10 are recorded at the second boundary in the cell. If the first bit is chosen as a reference bit, 10 is represented by a positive pulse while 01 is represented by a negative pulse. Of course, the reference bits and polarities could be reversed as desired. Also, the boundaries could be reversed. A third boundary also may be provided for synchronization purposes. On the other hand; the data stream may be self-synchronizing.

Figure 2:
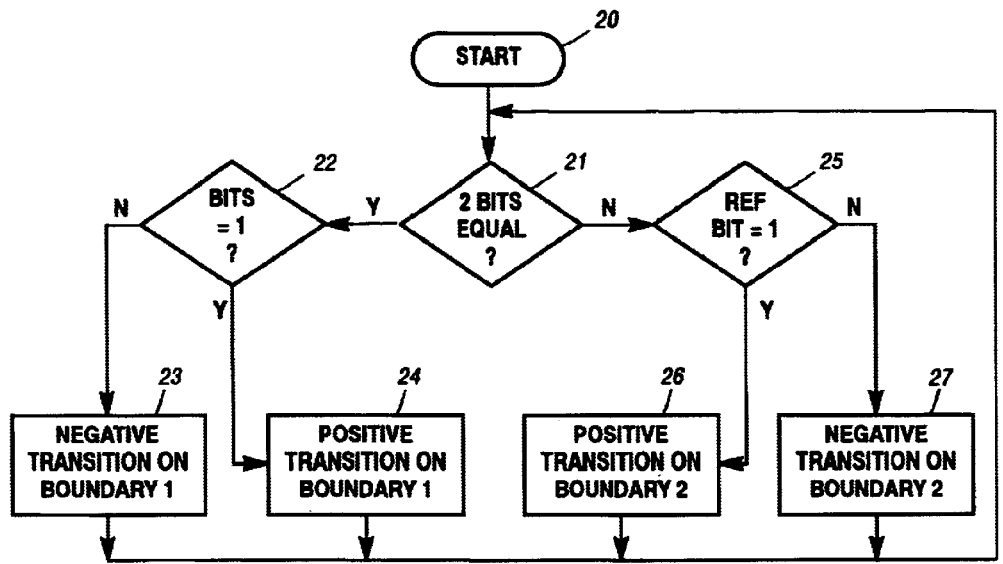
FIG. 2 illustrates a flow chart of an encoder for implementing the two-bit encoding technique of the invention.

FIG. 2 illustrates a flow chart of an encoder for implementing the two-bit encoding technique of the invention. As illustrated, the encoding process begins at step 20 by checking at step 21 to determine if the two incoming digits have the same value. If they do, the incoming bits are either 00 or 11. Accordingly, it is determined at step 22 whether the bits equal 1. If not, the value is 00 and a negative transition is recorded on boundary 1 at step 23; otherwise, the value is 11 and a positive transition is recorded on boundary 1 at step 24. On the other hand, if it is determined at step 21 that the incoming digits do not have the same value, then the incoming bits are either 10 or 01. Accordingly, one of the bits is chosen as a reference bit. If it is determined at step 25 that the reference bit has a value of 1, then a positive transition is recorded on boundary 2 at step 26. Otherwise, a negative transition is recorded on boundary 2 at step 27. The encoding process then moves on to the next two incoming bits for encoding.

Figure 3:
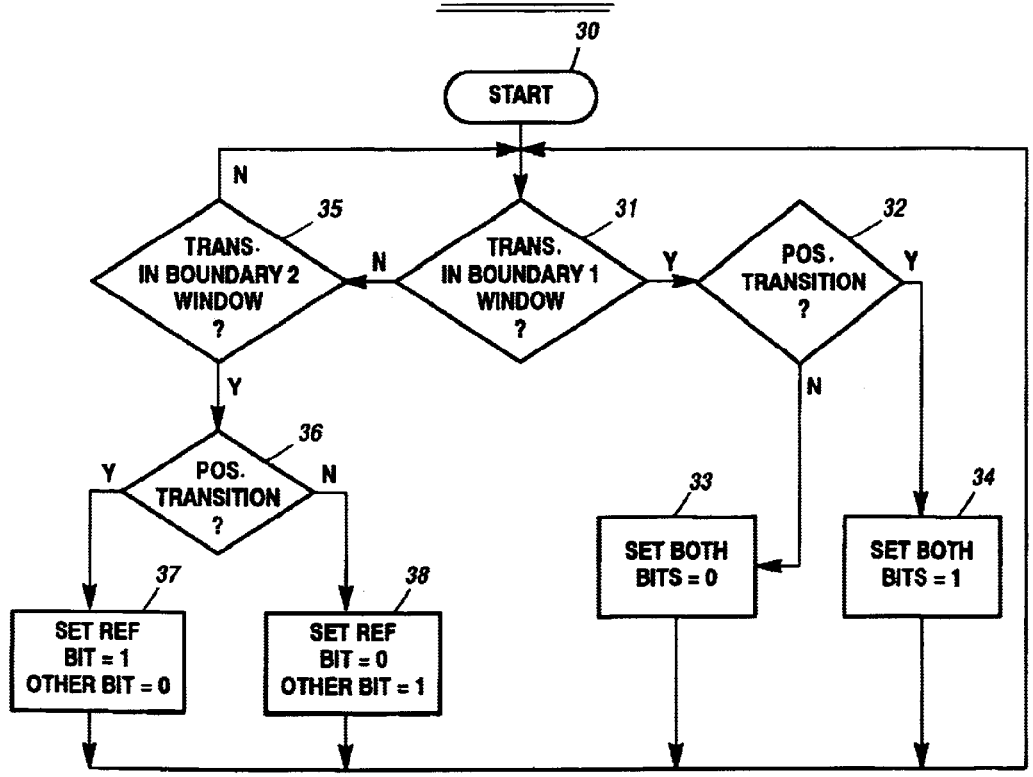
FIG. 3 illustrates a flow chart of a decoder for implementing the two-bit decoding technique of the invention.

FIG. 3 illustrates a flow chart of a decoder for implementing the two-bit decoding technique of the invention. As illustrated, the decoding process begins at step 30 by checking at step 31 to determine if there is a transition in a first window for boundary 1 (indicating that the bits have the same value). If so, it is determined at step 32 whether the transition is positive. If not, then it is known that both bits are 0 and both bits are set to 0 at step 33. On the other hand, if the transition is positive, then it is known that both bits are 1 and both bits are set to 1 at step 34. However, if at step 31 no transition is found in the window including boundary 1, then at step 35 it is determined whether a transition has occurred in a second window for boundary 2 (indicating that the bits have different values). If no transition is found, the process starts over to check for a transition. However, if a transition is found in the window for boundary 2 at step 35, then it is determined at step 36 whether the transition is positive. If so, then it is known that the reference bit is 1 and the reference bit is set to 1 while the other bit is set to 0 at step 37. On the other hand, if the transition is negative, then it is known that the reference bit is 0 and the reference bit is set to 0 while the other bit is set to 1 at step 38. After the two bits are decoded, the decoding process then moves on to the next two incoming bits for decoding.

Figure 4:
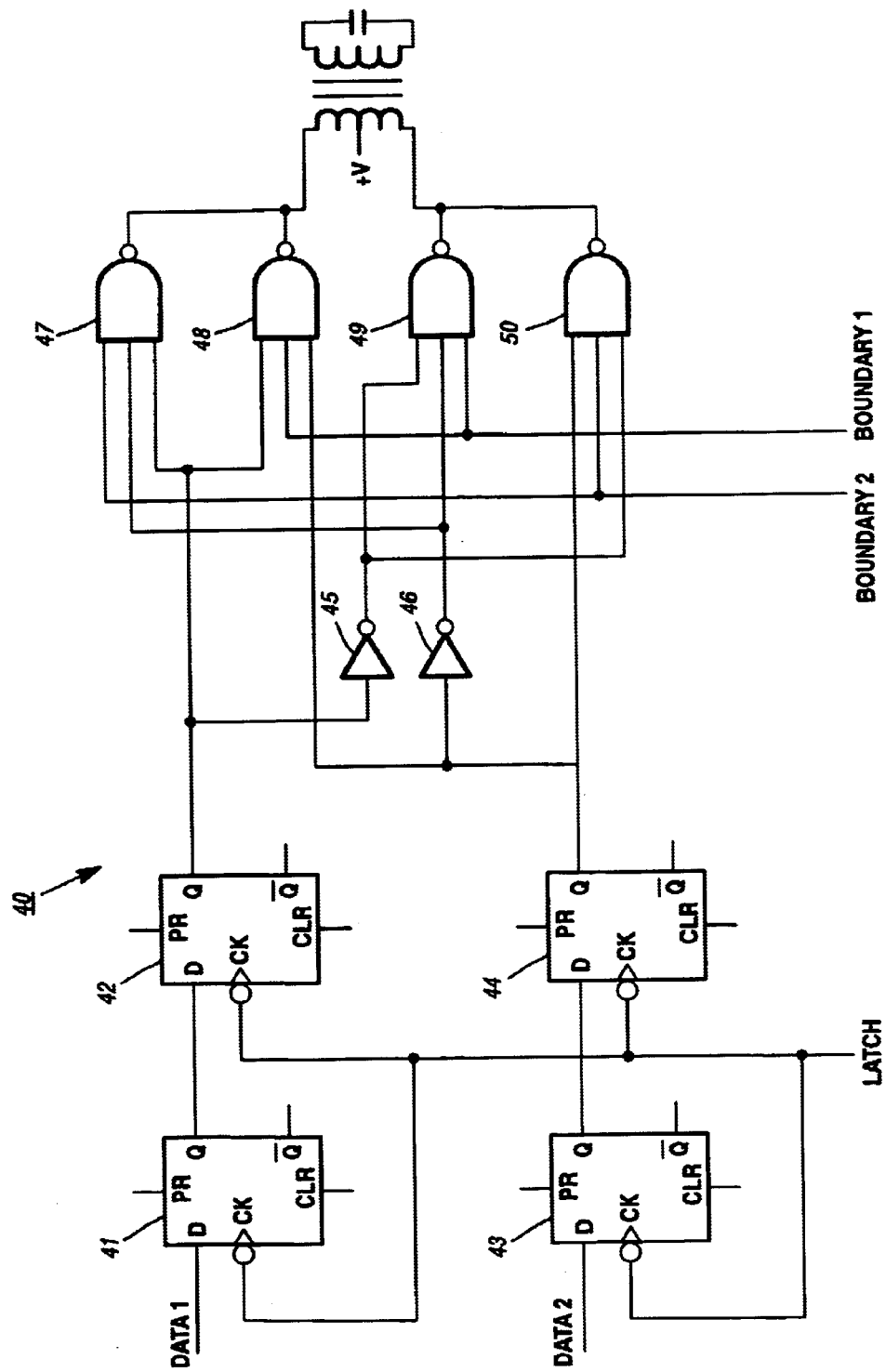
FIG. 4 illustrates a hardware embodiment of an encoder that implements the 2-bit encoding scheme of the first embodiment.
Figure 6:
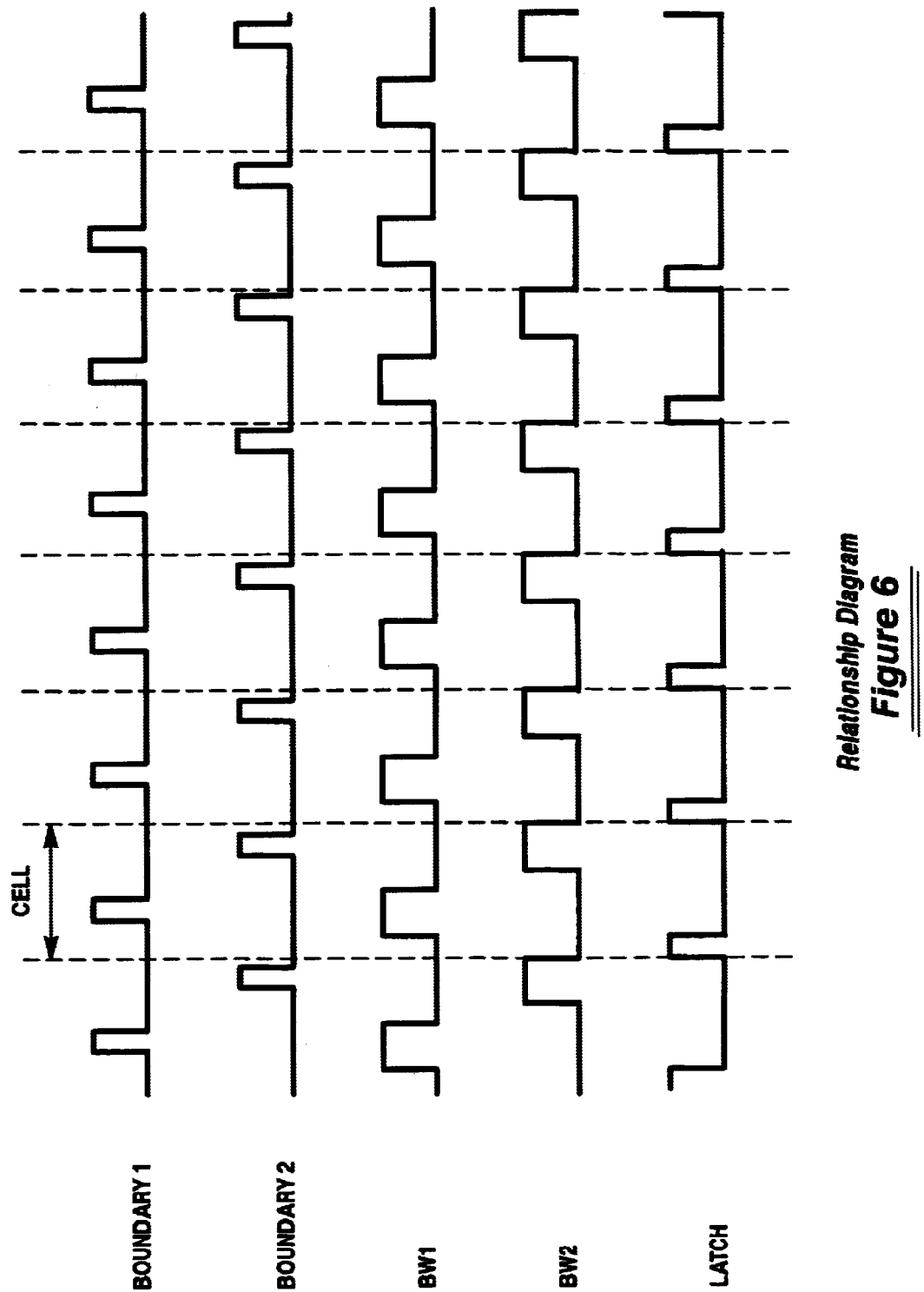
FIG. 6 illustrates timing signals used in the encoder of FIG. 4 and the decoder of FIG. 5.

FIG. 4 illustrates a hardware embodiment of an encoder that implements the 2 bit encoding scheme of the first embodiment. As illustrated, the first data bit is latched into first and second flip flops 41 and 42 that serve to buffer the data, while the second data bit is latched into first and second flip flops 43 and 44 that serve to buffer the data. As shown in FIG. 6, the latch signal (LATCH) defines the duration of the cell. The data read out of the flip flops 42 and 44 is selectively inverted by inverters 45 and 46 and provided to NAND gates 47, 48, 49, and 50 as indicated to selectively provide an output on the appropriate boundary in accordance with the desired encoding pattern. As indicated in FIG. 6, the signals "boundary 1" and "boundary 2" selectively gate through the data to the output depending upon the boundary to which the data is to be encoded. This process is repeated for all incoming data bits (Data1 and Data2).

Figure 5:
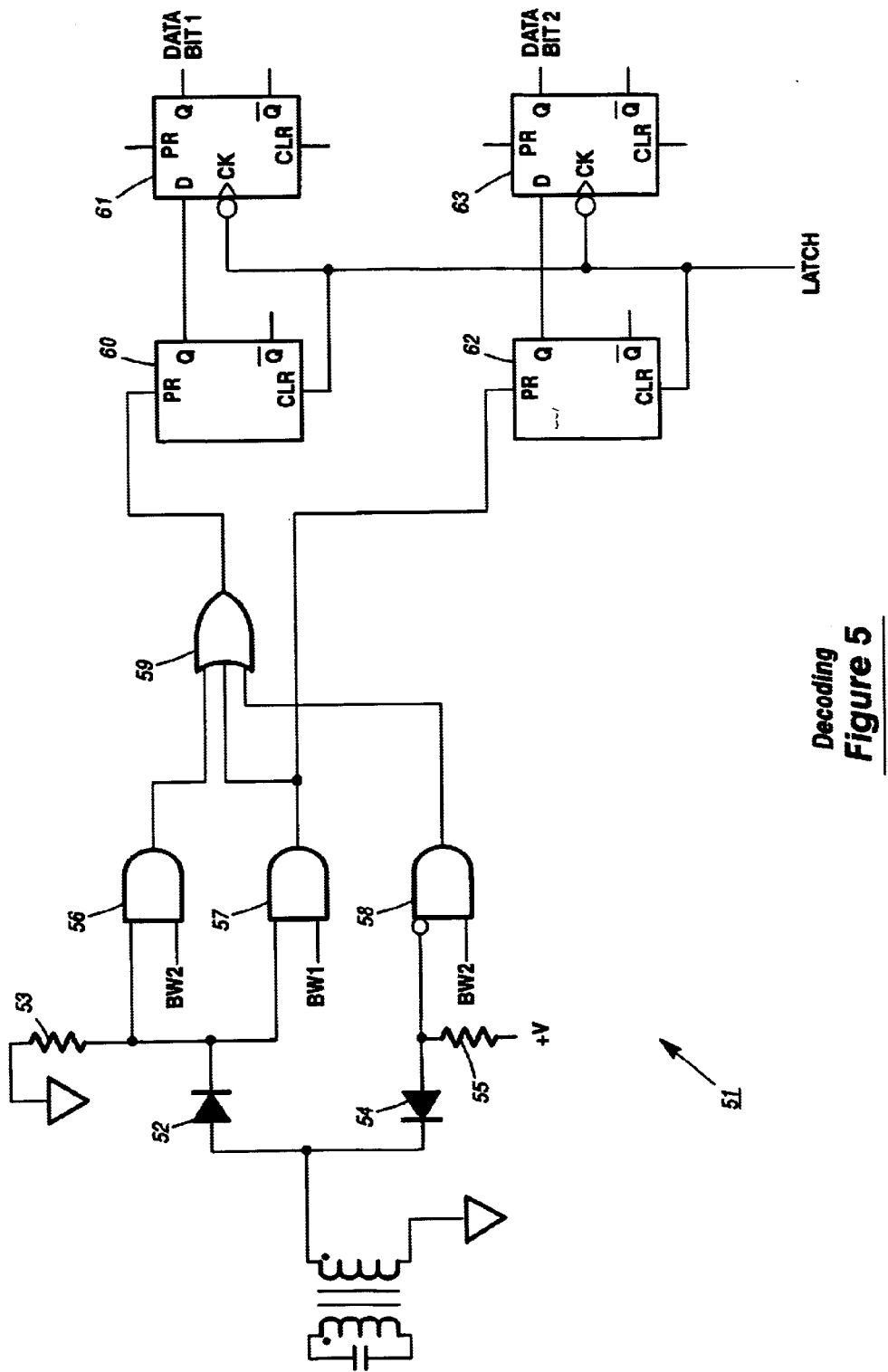
FIG. 5 illustrates a hardware embodiment of a decoder that implements the 2-bit decoding scheme of the first embodiment.

FIG. 5 illustrates a hardware embodiment of a decoder that implements the 2-bit decoding scheme of the first embodiment. As illustrated, the data to be decoded is passed through a rectifier such as diodes 52 and 54 that functions to separate the positive and negative pulses via grounding resistor 53 or pull up resistor 55, respectively. The data is provided to AND gates 56, 57, and 58 along with window signals BW1 and BW2 that define the windows for boundary 1 and boundary 2, respectively, as shown in FIG. 6. The output data is either provided directly to flip flop 62 or via OR gate 59 to flip flop 60. The LATCH signal (FIG. 6) serves to clock the data synchronously through flip flops 61 and 63, respectively, to provide the decoded outputs DATABIT1 and DATABIT2 as indicated. Thus, transitions discovered within each window are decoded as transitions on the respective boundaries in accordance with the two-bit encoding scheme of the invention.

The pairing of digits can be any pairing that optimizes a design. Two digits could be adjacent digits in a serial string, they could be alternate digits, or any desired pairing. Also, the boundaries defined within a cell need not match up with the edges of a cell. Also, the encoder and decoder of the invention may be readily implemented in a microprocessor using techniques known to those skilled in the art.

Figure 7:
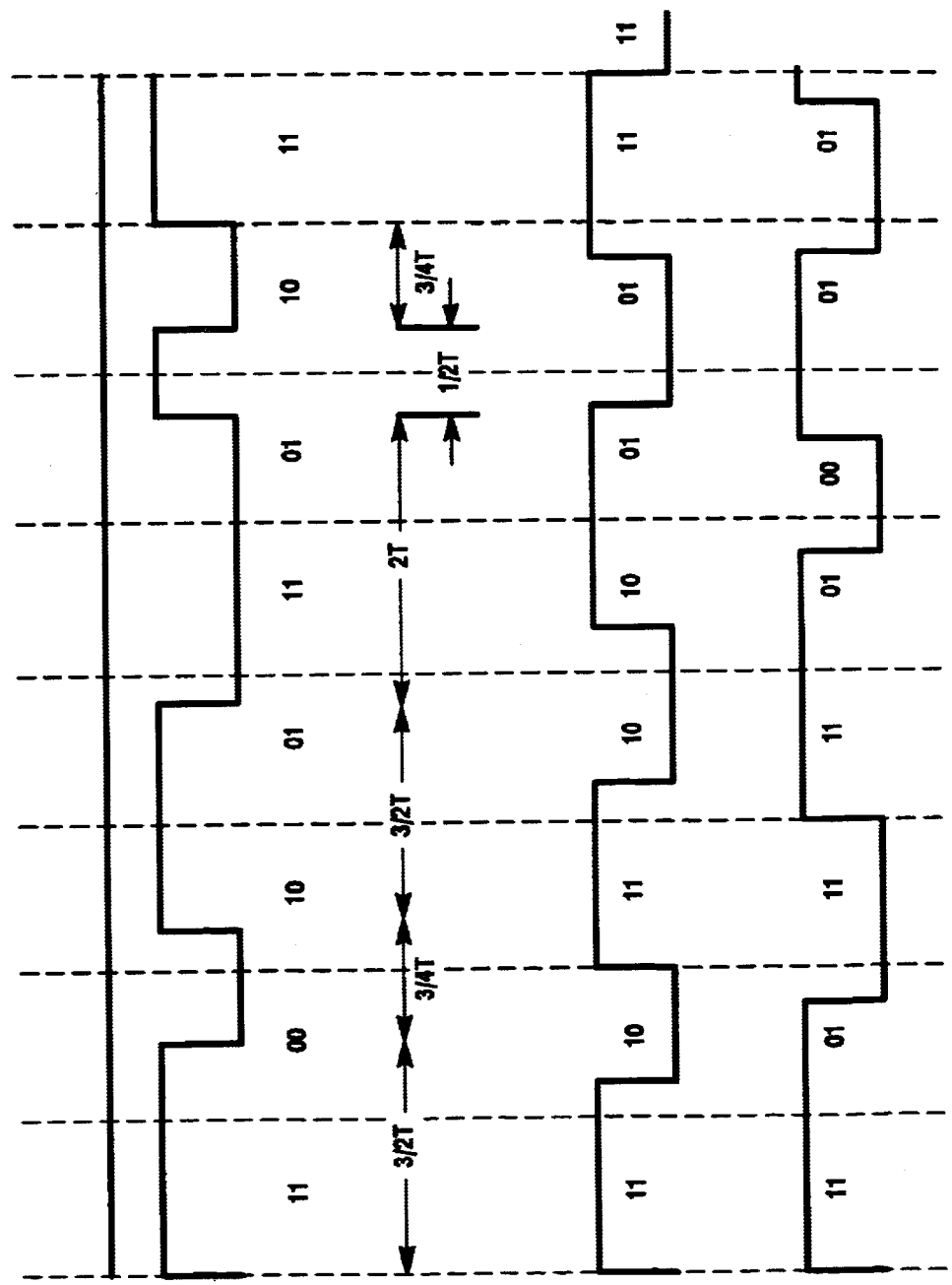
FIG. 7 illustrates an encoding in accordance with the invention where the location of a transition change may be used to define the encoding, irrespective of the direction of transition.

As shown in FIG. 7, the location of a transition change may be used to define the encoding, irrespective of the direction of transition. In the monopole example of FIG. 7, a 11 would be the encoding for a transition at the beginning of a cell, a 00 would be the encoding for a transition in the middle of a cell, a 10 would be the encoding for a transition approximately ¼ of the way through the cell, and a 01 would be the encoding for a transition approximately ¾ of the way through the cell. In other words, there are 4 boundaries per cell for a 2-bit example but only one state transition per cell on one of the boundaries. However, it should be noted that in the example of FIG. 7, a transition from a 01 to a 11 in adjacent cells does not cause a change in state at the beginning of the 11 cell because the transitions would otherwise be too close together. The logic is readily adjusted to account for this special case. Of course, the polarity of the transition may also be used in this embodiment to provide a second tier of encoding.

Those skilled in the art will appreciate that it is not necessary that polarities of the transition be the same for all pairs. For example, a like pair with a reference digit of one could transition in one direction, while those opposite pairs with a reference digit of one would transition in the opposite direction. No limitation is provided that requires each pair to transition in the same direction—alternation of the transition is permissible to provide better recording characteristics. For example, every other pair of like digits may change direction to provide for a more balanced quality in the recording media or to minimize DC components.

Reference boundaries may also change whereby, e.g., like transitions occur on the second boundary while unlike transitions occur on a first boundary. No limitation is applied to restrict the boundary placement. Thus, for design purposes or to prevent extreme conditions, the relative boundaries may change within a recording scheme and rules would be established that defined a particular transition and its application within the scheme. This latitude provides the means to implement various coding or physical recording schemes without limiting the application of this invention.

Figure 8:
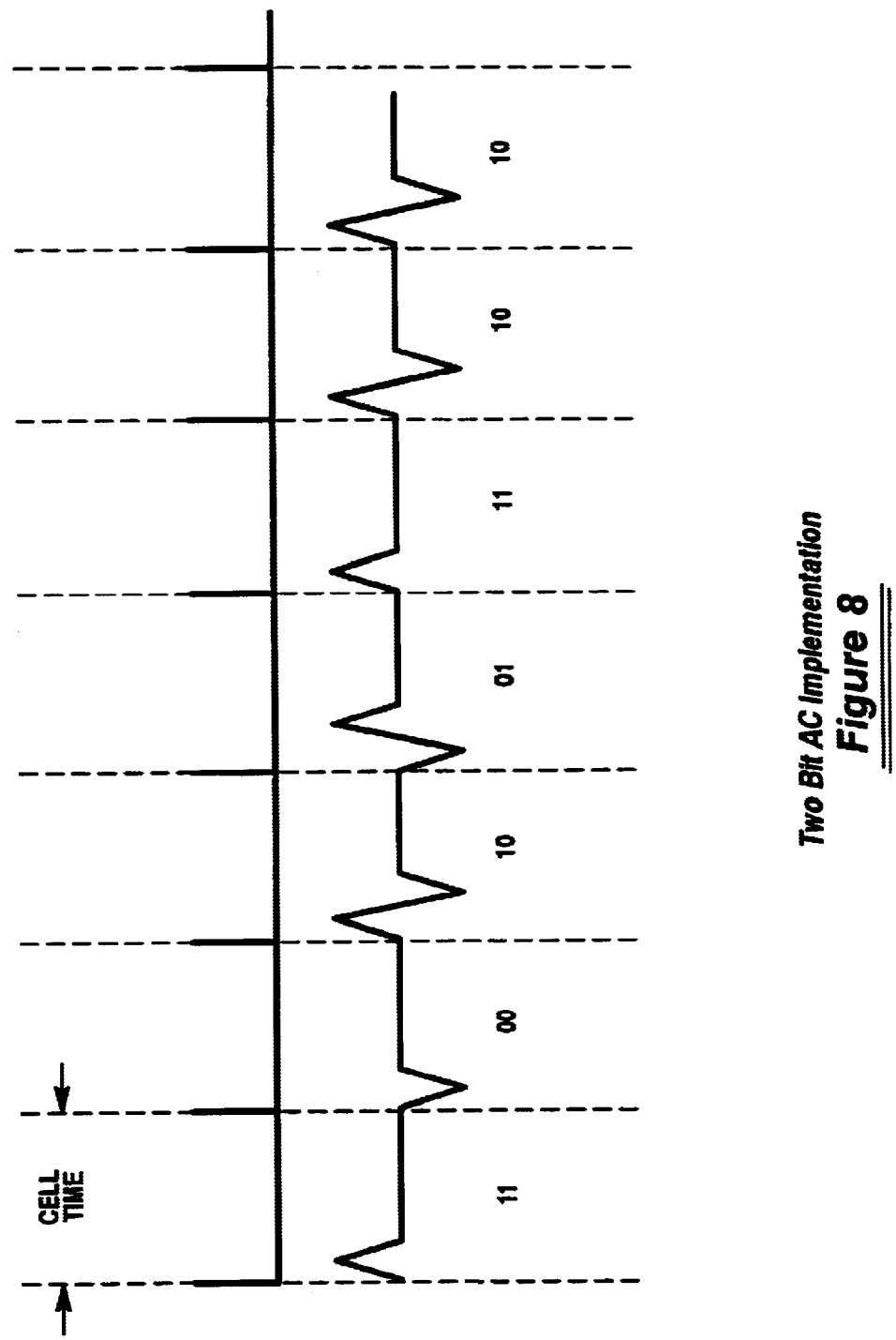
FIG. 8 illustrates a two-bit AC encoding implementation in accordance with an embodiment of the invention.

In addition, the invention is not limited to magnetic or optical recording implementations or to strictly digital implementations. For example, FIG. 8 illustrates a two-bit AC encoding implementation in accordance with the invention. In this embodiment, rather than providing a second boundary for the 01 or 10 transition, an AC signal with a first polarity represents 01 while an AC signal with the reverse polarity represents 10. Of course, these polarities may be readily reversed and the signals need not be aligned with the cell boundary.

Three Bit Encoding

Figure 9:
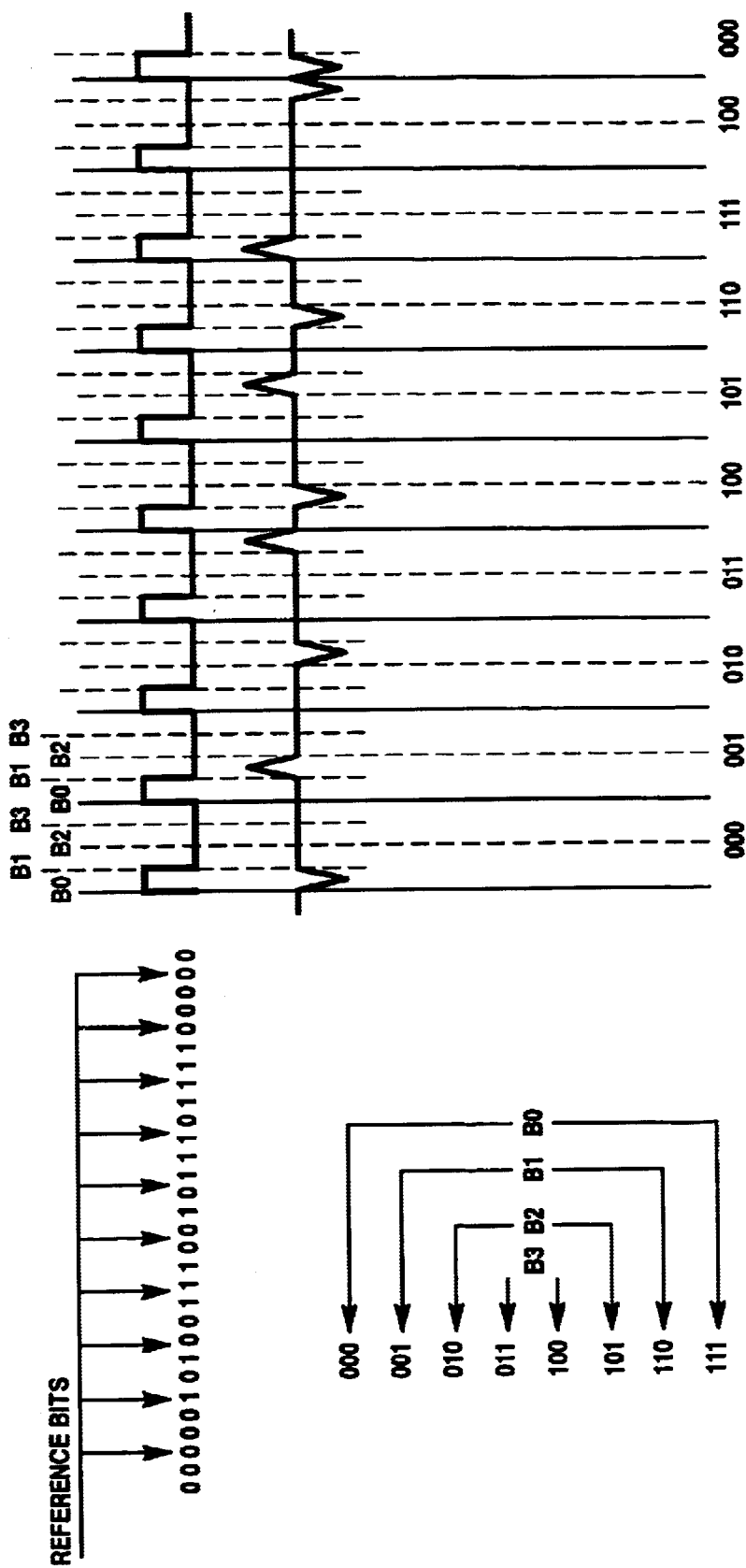
FIG. 9 illustrates an example of three-bit encoding using the techniques of the invention.

FIG. 9 illustrates an example of three-bit encoding using the techniques of the invention. As illustrated, an incoming bit stream to be encoded is broken into three-bit segments and a reference bit is selected. Since the number of bits n to be encoded is 3, $2^{n-1}+4$, so 4 boundaries B0–B3 are selected to define unique values for all 8 combinations of bits in the three-bit scheme as illustrated. In this example, the boundaries encode inverse bit combinations. For example, B0 is the boundary for 000 and 111; B1 is the boundary for 10 and 001; B2 is the boundary for 101 and 010; and B3 is the boundary for 100 and 01. As with the two-bit example, the value of the reference bit distinguishes the two possible values at the respective boundaries. Of course, the same approach may be used for more complicated, and longer, bit encoding arrangements in accordance with the techniques of the invention.

Four Bit Encoding

Figure 10:
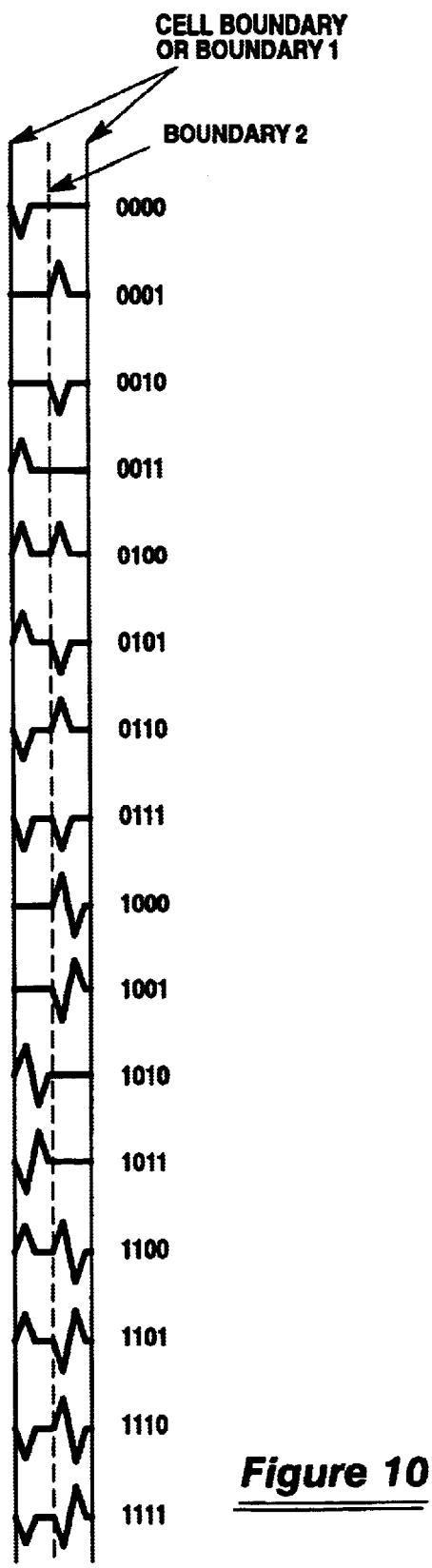
FIG. 10 illustrates a four-Bit AC embodiment in accordance with the invention.

FIG. 10 illustrates a 4-Bit AC embodiment in accordance with the invention. This embodiment is similar to the 2-bit AC embodiment of FIG. 8 except that two boundaries are used within the 4-bit cell and the AC signals define an encoding pattern. Those skilled in the art will appreciate that this particular implementation uses single pole (plus or minus) and bipolar signals (plus to minus or minus to plus) as a means of encoding multiple bits into a compressed format. As used herein, a "pole" is an arbitrary term used here to signify one or more differences—not necessarily magnitude or direction. In this embodiment, because all possible combinations are not used for bit encoding, the other code vectors may be used for different purposes. For example, some code vectors may be used for extended compression (e.g., n contiguous bytes of zero) or for control characters (e.g. cause an insert function, check characters, etc.)

As is apparent from FIG. 10, a three bit implementation also can be utilized by employing a subset of the four bit encoding (i.e. use first eight from 0000 to 0111).

In this example and other examples within the scope of the invention, the code vectors may be arbitrarily assigned to the code set. Any values may be selected as code vectors. Selecting particular code vectors may provide logical, electrical, or other advantages. As with other codes, the values may change to facilitate better performance, security, or the like. However, those skilled in the art will appreciate that if the unused vectors are used as "macro" compression characters (e.g. n bytes of zero), the compression ratio is not consistent.

Those skilled in the art also will readily appreciate that many additional modifications are possible in the exemplary embodiment without materially departing from the novel teachings and advantages of the invention. For example, the technique of the invention may be implemented to provide color encoding for a printer by providing a different color for each logical state. The technique of the invention may also be used to encode thermal variations, mechanical switch positions, or any other representation of two or more distinct states. Accordingly, any such modifications are intended to be included within the scope of this invention as defined by the following exemplary claims.

What is claimed:

1. A method of encoding a stream of digital data for transmission and/or storage, comprising the steps of:
defining a cell that encodes at least two bits in said stream of digital data that are to be encoded, said cell having at least two boundaries at different locations within said cell;
encoding said at least two bits whereby a transition occurs at a different boundary based on the logical state of the at least two bits to provide a first tier of encoding; and
encoding said at least two bits whereby a polarity of the transition encoded in said first tier encoding step defines a second tier of encoding.

2. A method as in claim 1, wherein said first tier encoding step comprises the step of determining whether said at least two bits in said stream of digital data have the same logical state and, if so, encoding said at least two bits at a first boundary in said cell; otherwise, encoding said at least two bits at a second boundary in said cell.

3. A method as in claim 2, wherein said second tier encoding step comprises the steps of providing a negative transition if the at least two bits have a first value and providing a positive transition if the at least two bits have a second value.

4. A method as in claim 2, wherein said second tier encoding step comprises the steps of selecting a reference bit from the at least two bits, providing a negative transition if the reference bit has a first value and providing a positive transition if the reference bit has a second value.

5. A method as in claim 1, wherein said second tier encoding step comprises the steps of providing an AC signal with a first polarity if the at least two bits have a first value and providing an AC signal with a second polarity inverse to said first polarity if the at least two bits have a second value.

6. A method as in claim 1, wherein said step of defining a cell includes the step of defining $2^{n-1}$ boundaries at different locations within said cell, where n is the number of bits to be encoded by said cell.

7. A method as in claim 6, wherein said first tier encoding step comprises the step of encoding respective inverse bit patterns of said at least two bits at the same boundaries.

8. A method as in claim 7, wherein said second tier encoding step comprises the steps of selecting a reference bit from the at least two bits, providing a negative transition if the reference bit has a first value and providing a positive transition if the reference bit has a second value.

9. A method of encoding a stream of digital data for transmission and/or storage, comprising the steps of:
defining a cell that encodes n bits in said stream of digital data, said cell having $2^{n-1}$ boundaries at different locations within said cell; and
encoding different patterns of said n bits at different boundaries within said cell.

10. A method as in claim 9, wherein said encoding step comprises the step of providing no transition at at least one predetermined boundary within a cell if an immediately preceding cell includes a pattern of said n bits that is to be encoded at a boundary closest to an end of said preceding cell.

11. A method as in claim 9, comprising the additional steps of selecting a reference bit from the n bits, providing a negative transition if the reference bit has a first value and providing a positive transition if the reference bit has a second value.

12. A method of encoding a stream of digital data for transmission and/or storage, comprising the steps of:
defining a cell that encodes n bits in said stream of digital data; and
encoding within each cell different patterns of values of said n bits with AC signals having different patterns and polarities based on the values of the respective bits within said cell.

13. A method of decoding a stream of received digital data, comprising the steps of:
defining respective cells in said received digital data, each cell decoding at least two bits for each transition in a cell, said cell having at least first and second boundaries at different locations within said cell;
detecting a transition in said cell in a first window about said first boundary or in a second window about said second boundary; and
if a transition is detected in said detecting step, decoding said at least two bits to a unique value based on whether the transition occurred in said first window or said second window and a polarity of the transition.

14. A method as in claim 13, wherein when a transition is detected in said first window, said decoding step comprises the steps of determining whether said transition is positive and, if so, decoding at least two bits to have the same first logical state; otherwise, decoding at least two bits to have the same second logical state.

15. A method as in claim 14, wherein when a transition is detected in said second window, said decoding step comprises the steps of determining whether said transition is positive and, if so, decoding at least two bits to have a first pair of logical states; otherwise, decoding at least two bits to have a second pair of logical states inverse to said first pair of logical states.

16. A method as in claim 13, wherein said decoding step comprises the steps of decoding at least two bits to have a first logical bit pattern if an AC signal with a first polarity is detected in one of said windows and decoding at least two bits to have a second logical bit pattern if an AC signal with a second polarity inverse to said first polarity is detected in one of said windows.

17. A method as in claim 13, wherein said step of defining respective cells includes the step of defining $2^{n-1}$ boundaries at different locations within each cell, where n is the number of bits to be decoded within each respective cell.

18. A method as in claim 17, wherein said decoding step comprises the step of decoding respective inverse bit patterns at the same boundary using the polarity of the transition.

19. A method as in claim 18, wherein said decoding step comprises the steps of determining that a reference bit in the decoded data within a cell has a first logical value if a negative transition is detected and that the reference bit in the decoded data within the cell has a second logical value if a positive transition is detected.

20. A method of decoding a stream of received digital data, comprising the steps of
defining respective cells in said received digital data, each cell decoding n bits in said stream of digital data and each cell having $2^{n-1}$ boundaries at different locations within said cell;

detecting a transition in said cell in a window about one of said $2^{n-1}$ boundaries; and if a transition is detected in said detecting step, decoding different patterns of said n bits to a unique value based on which window of a cell the transition was detected in.

21. A method as in claim 20, wherein said decoding step comprises the step of decoding respective inverse bit patterns at the same boundaries using the polarity of the transition.

22. A method of decoding a stream of received digital data, comprising the steps of:

defining respective cells in said received digital data, each cell decoding n bits in said stream of received digital data; and decoding within each cell different patterns of values of said n bits based on the pattern and polarity of an AC signal detected within said cell.

23. A digital encoder that encodes a stream of digital data for transmission and/or storage, comprising:

a boundary circuit responsive to at least one boundary signal to define a cell having at least two boundaries at different locations within said cell; and an encoder circuit that encodes said at least two bits such that a transition occurs at a different boundary based on the logical state of the at least two bits to define a first tier of encoding and that encodes said at least two bits such that a polarity of the transition defines a second tier of encoding.

24. An encoder as in claim 23, wherein said encoder circuit determines whether at least two bits in said stream of digital data have the same logical state and, if so, encodes said at least two bits at a first boundary in said cell and otherwise encodes said at least two bits at a second boundary in said cell.

25. An encoder as in claim 23, wherein said encoder circuit generates a negative transition if the at least two bits have a first value and generates a positive transition if the at least two bits have a second value.

26. An encoder as in claim 23, wherein encoder circuit selects a reference bit from the at least two bits, provides a negative transition if the reference bit has a first value and provides a positive transition if the reference bit has a second value.

27. An encoder as in claim 23, wherein said encoder circuit outputs an AC signal with a first polarity if the at least two bits have a first value and outputs an AC signal with a second polarity inverse to said first polarity if the at least two bits have a second value.

28. An encoder as in claim 23, wherein said boundary circuit defines $2^{n-1}$ boundaries at different locations within said cell, where n is the number of bits to be encoded by said cell.

29. An encoder as in claim 28, wherein said encoder circuit encodes respective inverse bit patterns of said at least two bits at the same boundaries.

30. An encoder as in claim 29, wherein said encoder circuit selects a reference bit from the at least two bits, provides a negative transition if the reference bit has a first value and provides a positive transition if the reference bit has a second value.

31. An encoder that encodes a stream of digital data for transmission and/or storage, comprising:

a boundary circuit responsive to at least one boundary signal to define a cell that encodes n bits in said stream of digital data, said cell having $2^{n-1}$ boundaries at different locations within said cell; and an encoder circuit that encodes different patterns of values of said n bits at different boundaries within said cell.

32. An encoder as in claim 31, wherein said encoder circuit provides no transition at at least one predetermined boundary within a cell if an immediately preceding cell includes a pattern of said n bits that is to be encoded at a boundary closest to an end of said preceding cell.

33. An encoder as in claim 31, wherein said encoder circuit selects a reference bit from the n bits, provides a negative transition if the reference bit has a first value and provides a positive transition if the reference bit has a second value.

34. An encoder that encodes a stream of digital data for transmission and/or storage, comprising:

a boundary circuit responsive to at least one boundary signal to define a cell that encodes n bits in said stream of digital data; and an encoder circuit that encodes within each cell different patterns of said n bits with AC signals having different patterns and polarities based on the values of the respective bits within said cell.

35. A decoder that decodes a stream of received digital data, comprising:

a boundary circuit that defines respective cells in said received digital data, each cell decoding at least two bits for each transition in a cell, said cell having at least first and second boundaries at different locations within said cell; and a decoder circuit that decodes said received digital data by detecting a transition in said cell in a first window about said first boundary or in a second window about said second boundary and, if a transition is detected in said first window or said second window, said decoder circuit decodes said at least two bits to a unique value based on whether the transition occurred in said first window or said second window and a polarity of the transition.

36. A decoder as in claim 35, wherein when said decoder circuit detects a transition in said first window, said decoder circuit determines whether said transition is positive and, if so, said decoder circuit decodes at least two bits to have the same first logical state; otherwise, said decoder circuit decodes at least two bits to have the same second logical state.

37. A decoder as in claim 36, wherein when said decoder circuit detects a transition in said second window, said decoder circuit determines whether said transition is positive and, if so, said decoder circuit decodes at least two bits to have a first pair of logical states; otherwise, said decoder circuit decodes at least two bits to have a second pair of logical states inverse to said first pair of logical states.

38. A decoder as in claim 35, wherein said decoder circuit decodes at least two bits to have a first logical bit pattern if an AC signal with a first polarity is detected in one of said windows and decodes at least two bits to have a second logical bit pattern if an AC signal with a second polarity inverse to said first polarity is detected in one of said windows.

39. A decoder as in claim 35, wherein said boundary circuit defines respective cells with $2^{n-1}$ boundaries at different locations within said cell, where n is the number of bits to be decoded within each respective cell.

40. A decoder as in claim 39, wherein said decoder circuit decodes respective inverse bit patterns at the same boundaries using the polarity of the transition.

41. A decoder as in claim 40, wherein said decoder circuit determines that a reference bit in the decoded data within a cell has a first logical value if a negative transition is detected and that the reference bit in the decoded data within the cell has a second logical value if a positive transition is detected.

42. A decoder for decoding a stream of received digital data, comprising:
- a boundary circuit that defines respective cells in said received digital data, each cell decoding n bits in said stream of digital data and each cell having $2^{n-1}$ boundaries at different locations within said cell; and
- a decoder circuit that detects a transition in said cell in a window about one of said $2^{n-1}$ boundaries and, if a transition is detected, said decoder circuit decodes different patterns of said n bits to a unique value based on which window of a cell the transition was detected in.

43. A decoder as in claim 42, wherein said decoder circuit decodes respective inverse bit patterns at the same boundaries using the polarity of the transition.

44. A decoder for decoding a stream of received digital data, comprising:
- a boundary circuit that defines respective cells in said received digital data, each cell decoding n bits in said stream of received digital data; and
- a decoder circuit that decodes within each cell different patterns of said n bits based on the pattern and polarity of an AC signal detected within said cell.

* * * * *